(12) United States Patent
Kawase

(10) Patent No.: US 7,464,485 B2
(45) Date of Patent: Dec. 16, 2008

(54) APPARATUS AND METHOD FOR DEHUMIDIFYING AND DRYING RESIN PELLETS

(75) Inventor: Hatsuhiko Kawase, Aichi-ken (JP)

(73) Assignee: Star Seiki Co., Ltd., Nagoya-shi (JP)

( * ) Notice: Subject to any disclaimer, the term of this patent is extended or adjusted under 35 U.S.C. 154(b) by 247 days.

(21) Appl. No.: 11/545,391

(22) Filed: Oct. 10, 2006

(65) Prior Publication Data

US 2007/0130794 A1 Jun. 14, 2007

(30) Foreign Application Priority Data

Dec. 12, 2005 (JP) .............................. 2005-357122

(51) Int. Cl.
*F26B 13/30* (2006.01)
(52) U.S. Cl. .................... 34/60; 34/167; 34/92; 366/89
(58) Field of Classification Search ...................... 34/60, 34/475, 167, 92; 366/89
See application file for complete search history.

(56) References Cited

U.S. PATENT DOCUMENTS 3,685,804 A * 8/1972 Stansfield .................... 366/75
4,501,498 A * 2/1985 McKelvey .................... 366/69
5,597,525 A * 1/1997 Koda et al. .................. 264/537
6,328,919 B1 * 12/2001 Pham et al. ............... 264/177.1
6,790,025 B2 * 9/2004 Yamaguchi et al. ......... 425/198
2003/0059491 A1 * 3/2003 Konishi ........................ 425/8

FOREIGN PATENT DOCUMENTS

JP 3233419 B2 9/2001
JP 2005-028683 A 2/2005

* cited by examiner

*Primary Examiner*—S. Gravini
(74) *Attorney, Agent, or Firm*—Frishauf, Holtz, Goodman & Chick, P.C.

(57) ABSTRACT

A method for dehumidifying and drying resin pellets that can efficiently dry both non-crystallized resin pellets and crystallized resin pellets, the apparatus being adapted to downsizing. A control means 67 adapts to operate in a first drying mode of controlling the heating operation of the first heating member 25 for heating longitudinally divided regions of the first cylinder 5 section to produce differentiated respective heating effects and that of the second heating member 31 for uniformly heating the second cylinder 7 section so as to crystallize the supplied non-crystallized resin pellets NCRP and subsequently drying them and in a second drying mode of controlling the heating operation of the first heating member 25 and that of the second heating member 31 for uniformly heating the first and second cylinder 5,7 sections so as to drying the supplied crystallized resin pellets CRP.

5 Claims, 10 Drawing Sheets

APPARATUS AND METHOD FOR DEHUMIDIFYING AND DRYING RESIN PELLETS

BACKGROUND OF THE INVENTION

1. Field of the Invention

The present invention relates to an apparatus and a method for dehumidifying and drying resin pellets by removing moisture adhering to and bound water contained in non-crystallized resin pellets or crystallized resin pellets to be used as molding raw material in a resin molding machine.

2. Description of the Related Art

Dehumidifying and drying apparatus of the type under consideration include one disclosed in JP/3233419B2. The apparatus disclosed in the above-cited Patent Document is adapted to heat the resin pellets fed into a drying hopper under reduced pressure and dehumidifies and dries moisture adhering to and bound water contained in them. Such a resin dehumidifying and drying apparatus is effective for dehumidifying and drying crystallized resin pellets. However, problems arise when non-crystallized resin pellets such as polyester type resin pellets are dehumidified and dried under the conditions similar to those for dehumidifying and drying crystallized resin pellets. More specifically, non-crystallized resin pellets are softened and become molten under such conditions.

When resin pellets are softened, they adhere to each other to form resin blocks. Then, it is no longer possible to dehumidifying and drying resin pellets as so many units. Resin blocks produced as resin pellets adhere to each other to form resin blocks can no longer be used as molding raw material without processing them. Additionally, molten resin pellets adhere to the inner surface of the hopper and the surfaces of agitator blades in the hopper for agitating resin pellets to produce blocks. Then, it is no longer possible to dehumidifying and drying them. Furthermore, the resin adhering to the outer surface of the hopper and the surfaces of the agitator blades operates as thermal insulator to make it difficult to efficiently heat resin pellets.

Particularly, non-crystallized resin pellets are apt to be molten and become fused to form resin blocks when heated rapidly.

JP2005/28683A1 proposes a drying apparatus designed to dissolve the above disadvantages. A drying apparatus according to the above-cited patent document comprises a crystallizing hopper for crystallizing granular resin and a drying hopper for drying the resin crystallized in the crystallizing hopper and a hollow rotary shaft that has an open lower end and is treated for thermal insulation is vertically arranged in the crystallizing hopper and provided on the outer surface with agitator wings. The rotary shaft is driven to rotate and hot air is supplied into the crystallizing hopper by way of the rotary shaft.

However, the proposed drying apparatus requires a crystallizing hopper for crystallizing non-crystallized resin pellets and a drying hopper for drying crystallized resin pellets and is dedicated to drying crystallized resin pellets. Thus, the apparatus has large dimensions and is costly.

SUMMARY OF THE INVENTION

In view of the above-identified circumstances, it is therefore an object of the present invention to provide an apparatus and a method for dehumidifying and drying resin pellets that can efficiently dehumidify and dry both non-crystallized resin pellets and crystallized resin pellets, the apparatus being adapted to downsizing.

DETAILED DESCRIPTION OF THE PREFERRED EMBODIMENTS

Now, the present invention will be described by referring to the accompanying drawings that illustrate a preferred embodiment of the invention.

Figure 1:
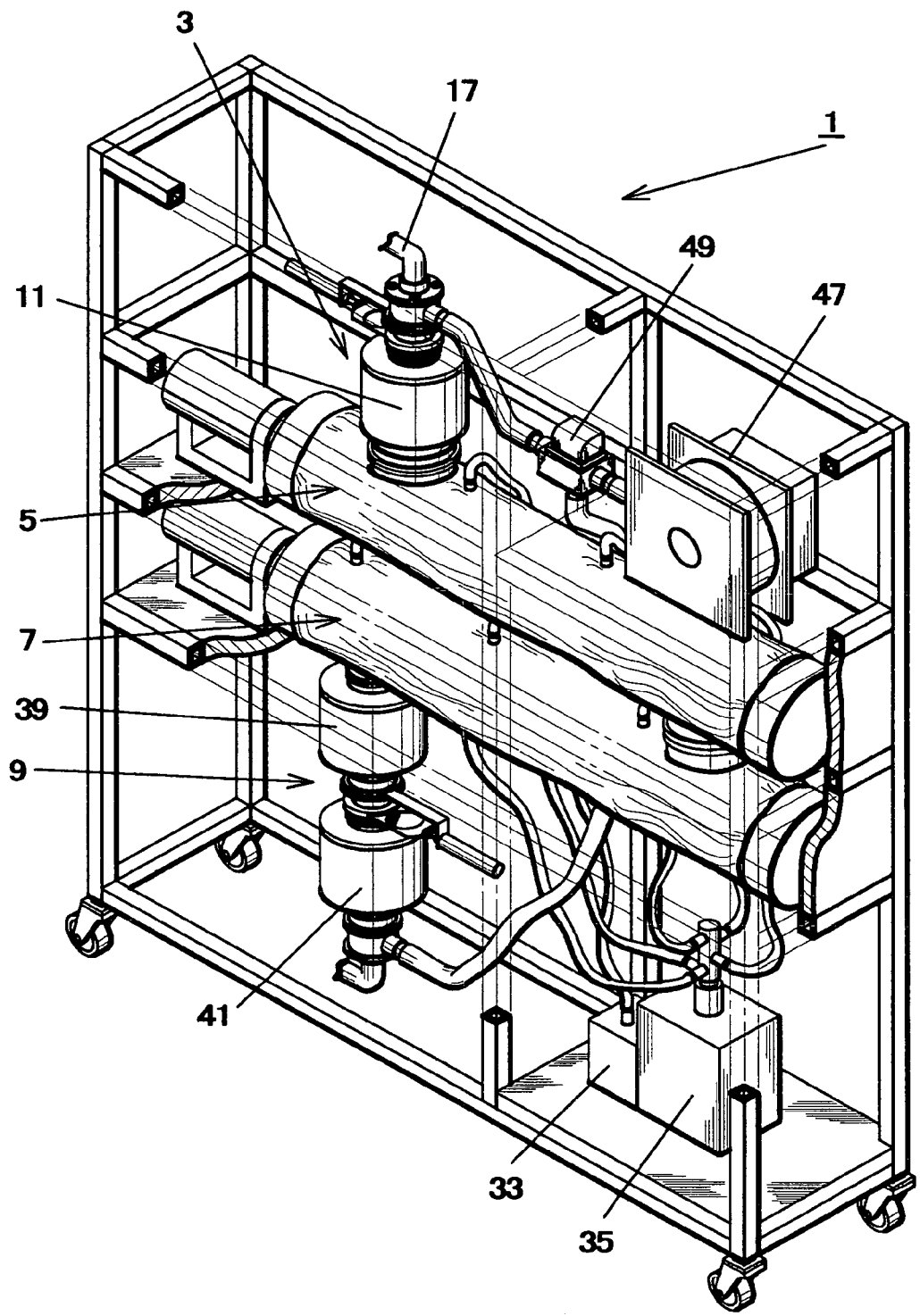
FIG. 1 is a schematic perspective view of a resin pellets dehumidifying and drying apparatus according to the present invention, showing the entire apparatus.
Figure 2:
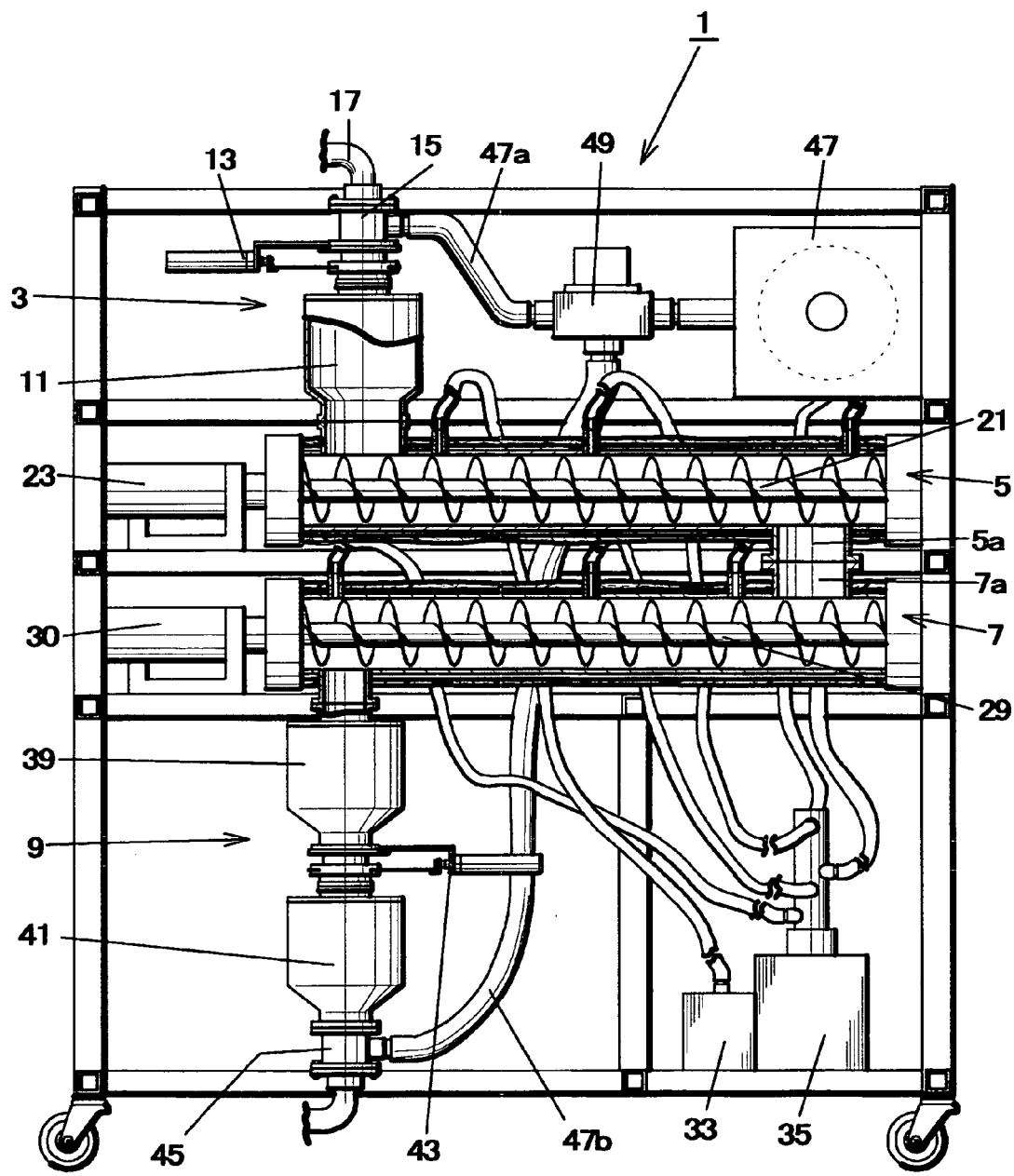
FIG. 2 is a schematic longitudinal cross sectional view of the resin pellets dehumidifying and drying apparatus taken through the center of the apparatus, the apparatus being partly omitted for the purpose of simplification.
Figure 3:
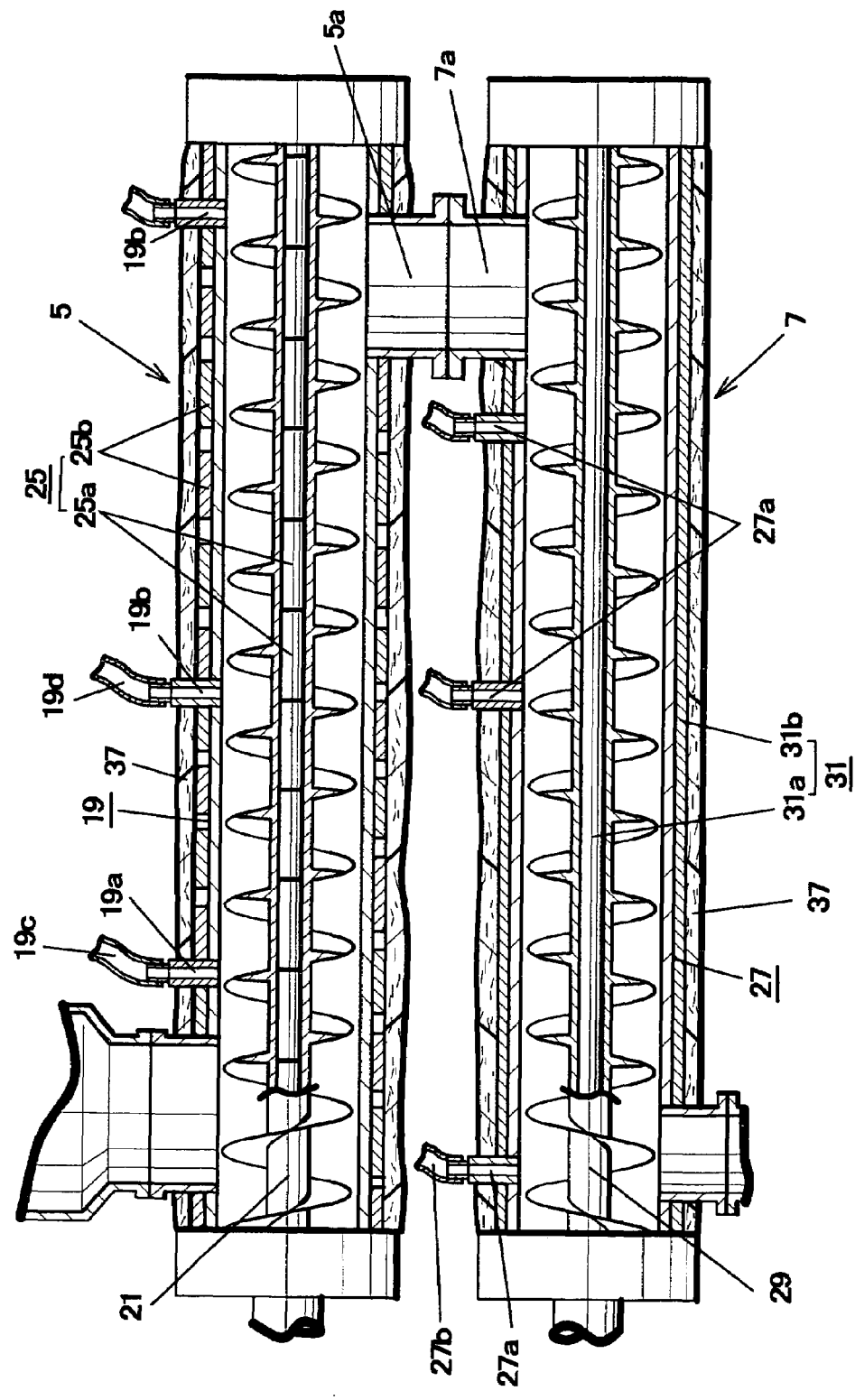
FIG. 3 is an enlarged schematic cross sectional view of the upper cylinder and the lower cylinder.

Referring firstly to FIGS. 1 through 3, the dehumidifying and drying apparatus 1 of this embodiment comprises a feed-in hopper section 3, a first cylinder section 5, a second cylinder section 7 and a delivery hopper section 9. The feed-in hopper section 3 has an intake section 15 fitted thereto above the hopper container 11 thereof by way of an upper switching device 13 so that resin pellets are introduced by way of a feed-in hose 17 connected to the intake section 15.

The upper switching device 13 includes an opening/closing plate 13a that is supported between the upper aperture of the hopper container 11 and the lower aperture of the intake section 15 so as to be horizontally movable and an actuator member 13b, which may typically be an air cylinder, for driving the opening/closing plate 13a to move back and forth. The opening/closing plate 13a is thin and made of a resilient material such as stainless steel. It is provided at a part thereof with an aperture section 13c that allows an upper part of the hopper container 11 and the intake section 15 to communicate with each other.

The left end of the first cylinder section 5 having a horizontal axial line is fitted to a lower part of the feed-in hopper section 3 so as to make them communicate with each other. The first cylinder section 5 includes an upper level cylinder 19, a first transfer screw 21 rotatably supported in the upper level cylinder 19, an electric motor 23 for driving the first transfer screw 21 to rotate at a rotary speed that realizes a required transfer rate and a first heating member 25 for heating the upper level cylinder 19 and the first transfer screw 21.

The upper level cylinder 19 is provided at the left end thereof with an air inlet port 19a and at a middle section and at the right end thereof with air outlet ports 19b. An air supply hose 19c is fitted to the air inlet port 19a while air exhaust hoses 19d are connected to the respective air outlet ports 19b.

The first heating member 25 includes a plurality of sheath heaters 25a horizontally driven into the shaft of the first transfer screw 21 and a plurality of surface heaters 25b separated from each other and fitted to the outer peripheral surface of the upper level cylinder 19. The plurality of sheath heaters 25a and the surface heaters 25b are electrically energized and so controlled that the entire upper level cylinder 19 is heated uniformly or the temperature of the upper level cylinder 19 may gradually rise from the left side toward the right side.

The second cylinder section 7 also has a horizontal axial line and is fitted to the right lower end in FIG. 1 of the first cylinder section 5 so as to communicate with the latter and extend horizontally in the direction opposite to the extending direction of the latter. The apertures of the connection ports 5a, 7a of the first cylinder section 5 and the second cylinder section 7 have a diameter that agrees with the inner diameter of the upper level cylinder 19.

The second cylinder section 7 includes a lower level cylinder 27 having an inner diameter that agrees with the inner diameter of the upper level cylinder 19 and made of metal such as stainless steel, a second transfer screw 29 rotatably supported in the lower level cylinder 27, an electric motor 30 for driving the second transfer screw 29 to rotate at a rotary speed that realizes a required transfer rate and a second heating member 31 for heating the lower level cylinder 27 and the second transfer screw 29 to a required temperature level.

The lower level cylinder 27 is provided at the left end, at a middle section and at a right side thereof with respective air outlet ports 27a and air exhaust hoses 27b are connected to the respective air outlet ports 27a.

The second heating member 31 includes a plurality of sheath heaters 31a horizontally driven into the shaft of the second transfer screw 29 and a plurality of surface heaters 31b separated from each other and fitted to the outer peripheral surface of the lower level cylinder 27. The second heating member 31 is electrically energized and so controlled manner as to heat the lower level cylinder 27 substantially uniformly.

An air supply unit 33 is connected to the air inlet port 19a of the upper level cylinder 19 by way of the air supply hose 19c whereas an air exhaust unit 35, which may typically be a blower or a vacuum pump, is connected to the air outlet ports 19b, 27a by way of the respective air exhaust hoses 19d, 27b. Desirably, the air supply unit 33 is designed to supply dehumidified dry air. A thermally insulating material 37 such as glass wool is wound around the outer peripheral surfaces of the first and second cylinders 19, 27.

The delivery hopper section 9 is fitted to a left lower part in FIG. 1 of the second cylinder section 7. The delivery hopper section 9 includes a buffer hopper 39 and a delivery hopper 41 fitted to a lower part of the buffer hopper 39 by way of a lower switching device 43.

The buffer hopper 39 temporarily stores the dehumidified resin pellets that are delivered from the second cylinder section 7. The lower switching device 43 includes an opening/closing plate 43a that is supported between the buffer hopper 39 and the delivery hopper 41 so as to be horizontally movable and an actuator member 43b, which may typically be an air cylinder, for driving the opening/closing plate 43a to selectively move in a horizontal direction. The opening/closing plate 43a is thin and made of a resilient material such as stainless steel. It is provided at a part thereof with an aperture section 43c that allows the buffer hopper 39 and the delivery hopper 41 to communicate with each other.

The delivery hopper 41 is provided to temporarily store dehumidified and dried resin pellets when they are supplied to a raw material supply section of the resin molding machine. It is provided at a lower part thereof with an executor section 45.

An air exhaust hose 47a is connected to the above-described intake section 15 from a pneumatic device 47, while an air supply hose 47b is connected to the executor section 45 from the pneumatic device 47. The pneumatic device 47 is typically formed by using a blower and adapted to be switched to supply or deliver air by means of a changeover valve 49 in such a way that it produces negative pressure in the intake section 15 in order to introduce resin pellets into the hopper container 11 and, at the same time, supplies compressed air into the executor section 45 in order to introduce dehumidified and dried resin pellets into the raw material supply section (not shown) of the resin molding machine.

Level sensors 55, 57, 59 are fitted respectively to the hopper container 11, the feeding upper limit position of the buffer hopper 39 and the lower limit position of the delivery hopper 41 for the purpose of detecting the quantities of resin pellets in them so that a detection signal is output when the quantity of resin pellets in the inside of any of them falls under a predetermined level. Additionally, a plurality of temperature sensors 61, 63 and a plurality of vacuum sensors 65, 66 are fitted to the upper level cylinder 19 and the lower level cylinder 27 and arranged in a horizontal direction.

Figure 4:
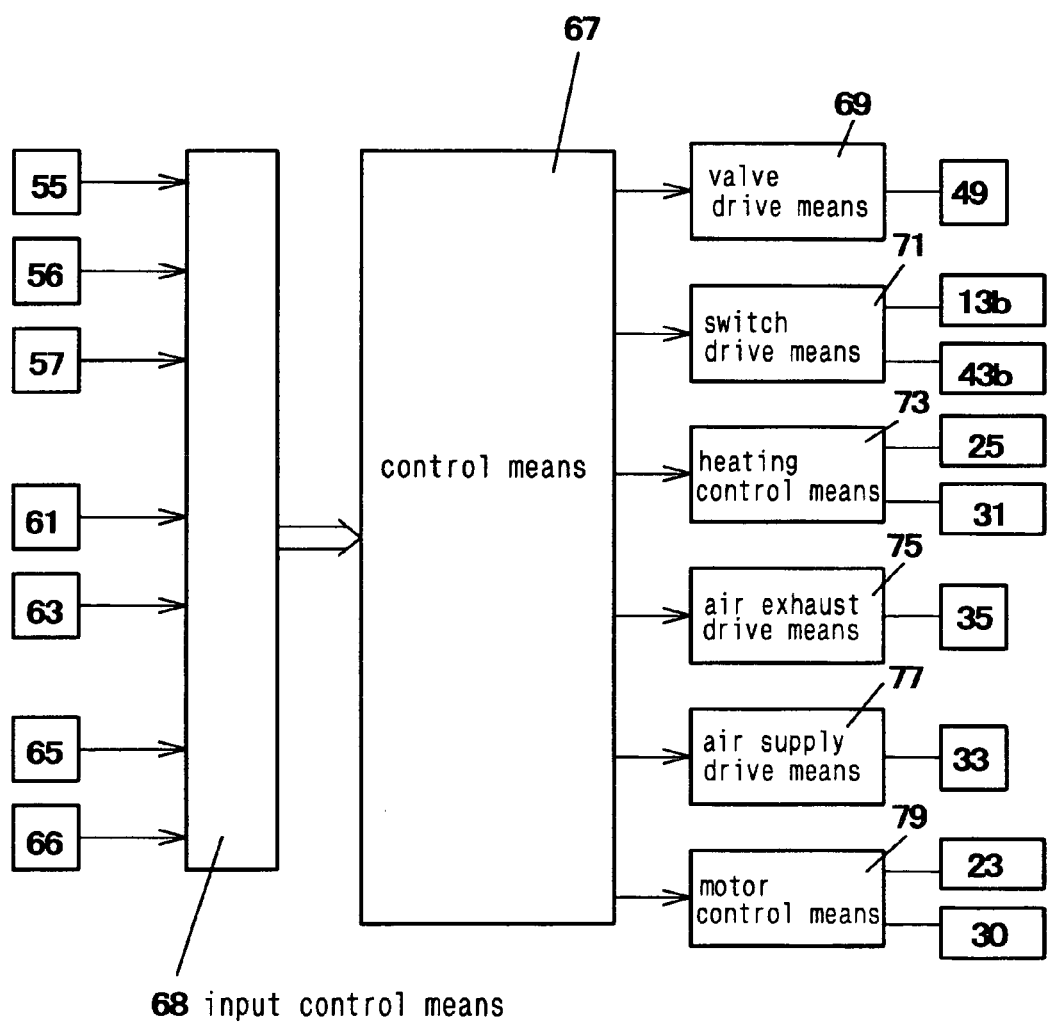
FIG. 4 is a schematic electric block diagram of the resin pellets dehumidifying and drying apparatus, illustrating the control system of the apparatus.
Figure 5:
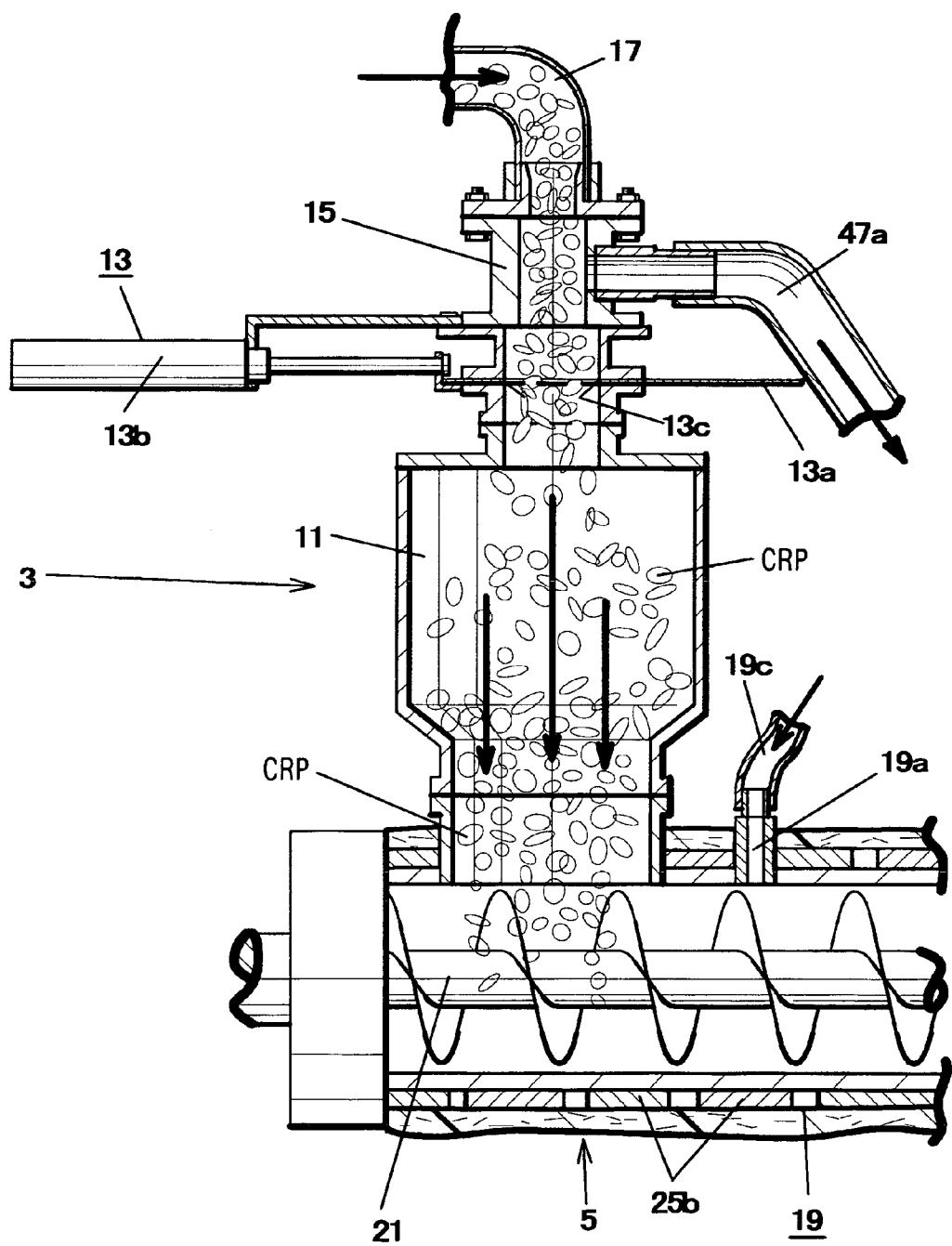
FIG. 5 is a schematic illustration of resin pellets being introduced into the resin pellets dehumidifying and drying apparatus.

Now, referring to FIG. 4, various level sensors 55, 57, 59, 61, 63, 65, 66 are connected to the input side of control means 67 by way of an input control means 68. Of these, the level sensor 55 outputs a feed-in completion signal to the control means 67 when a required quantity of non-crystallized resin pellets or crystallized resin pellets that are not dried yet is fed into the hopper container 11. The level sensor 57 outputs a delivery completion signal to the control means 67 when a required quantity of dehumidified and dried resin pellets is fed into the buffer hopper 39. The level sensor 59 outputs a feed-in completion signal to the control means 67 when the supply of a required quantity of dehumidified and dried resin pellets from the inside of the delivery hopper 41 to the raw material supply section of the resin molding machine is completed.

The temperature sensors 61 fitted to the upper level cylinder 19 arranged horizontally and respectively detect the temperatures of the left side, the middle section and the right side of the upper level cylinder 19 in FIG. 1 and output detection signals to the control means 67. The temperature sensor 63 fitted to the lower level cylinder 27 detects the temperature of the lower level cylinder 27 and outputs a detection signal to the control means 67.

The vacuum sensors 65, 66 fitted respectively to the upper level cylinder 19 and the lower level cylinder 27 detect the degree of vacuum of the upper level cylinder 19 and that of the lower level cylinder 27 and output detection signals to the control means 67.

A valve drive means 69 is connected to the output side of the control means 67 so as to control the changeover valve 49 connected to the valve drive means 69 for supplying or delivering air according to the signals from the level sensors 55 and 59.

A switch drive means 71 is connected to the output side of the control means 67 so as to selectively drive the actuator members 13b, 43b for opening or closing according to the signals from a start switch (not shown) or the level sensors 55, 57, 59.

A heating control means 73 is connected to the output side of the control means 67 so as to control the electric currents applied respectively to the first and second heating members 25, 31 according to the detection signals from the temperature sensors 61, 63 and also the resin pellets heating temperature of the upper level cylinder 19 and that of the lower level cylinder 27.

An air exhaust drive means 75 is connected to the output side of the control means 67 so as to control the operation of driving the air exhaust unit 35 according to the detection signal from the vacuum sensor 65 and keep the inside of the upper level cylinder 19 and that of the lower level cylinder 27 to a required low pressure level.

An air supply drive means 77 is connected to the output side of the control means 67 so as to drive the air supply unit 33 connected to it and supply a required quantity of air at least to the inside of the upper level cylinder 19.

A motor control means 79 is connected to the output side of the control means 67 so as to control and drive the electric motors 23 and 30 connected to it and causes them to transfer resin pellets at respective required transfer rates in the upper level cylinder 19 and the lower level cylinder 27.

Now, the dehumidifying and drying operation of the dehumidifying and drying apparatus 1 having the above-described configuration will be described below.

Firstly, the operation of dehumidifying and drying crystallized resin pellets will be described. As the start switch is turned ON, the actuator member 13b is driven to open the plate 13a and hence the upper aperture of the hopper container 11. At the same time, the actuator member 43b is driven to close the plate 43a and hence the communication path between the buffer hopper 39 and the delivery hopper 41 and subsequently turns the changeover valve 49 to the air exhaust side to exhaust the inside of the intake section 15 so as to draw and introduce crystallized resin pellets CRP that are not dried yet into the hopper container 11 under negative pressure by way of the feed-in hose 17.

As the crystallized resin pellets CRP introduced into the container hopper 11 get to a required quantity level and a feed-in completion signal is input from the level sensor 55, the actuator member 13b is driven to close the plate 13a and hence the upper aperture of the hopper container 11.

During the above-described operation, the sheath heaters 25a and the surface heaters 25b of the first heating member 25 are electrically energized and so controlled that the upper level cylinder 19 shows a required temperature level substantially uniformly in the horizontal direction while the sheath heaters 31a and the surface heaters 31b of the second heating member 31 are also electrically energized and so controlled that the entire lower level cylinder 27 shows a required temperature level substantially same as that of the upper level cylinder 19. Additionally, the air supply unit 33 is operated to introduce air at least into the upper level cylinder 19 by a required quantity while the air exhaust unit 35 is operated to exhaust the inside of the upper level cylinder 19 and that of the lower level cylinder 27 to produce a required low pressure level there.

Then, the electric motors 23, 30 are driven to by turn drive the first and second transfer screws 21, 29 respectively to realize required feeding rates so that the crystallized resin pellets CRP in the hopper container 11 are transferred from the left side toward the right side in FIG. 1 and the crystallized resin pellets CRP in the lower level cylinder 27 are transferred from the right side toward the left side in FIG. 1, while they are heated under reduced pressure and dehumidified and dried as the moisture adhering to them and the bound water contained in the inside are removed.

Figure 6:
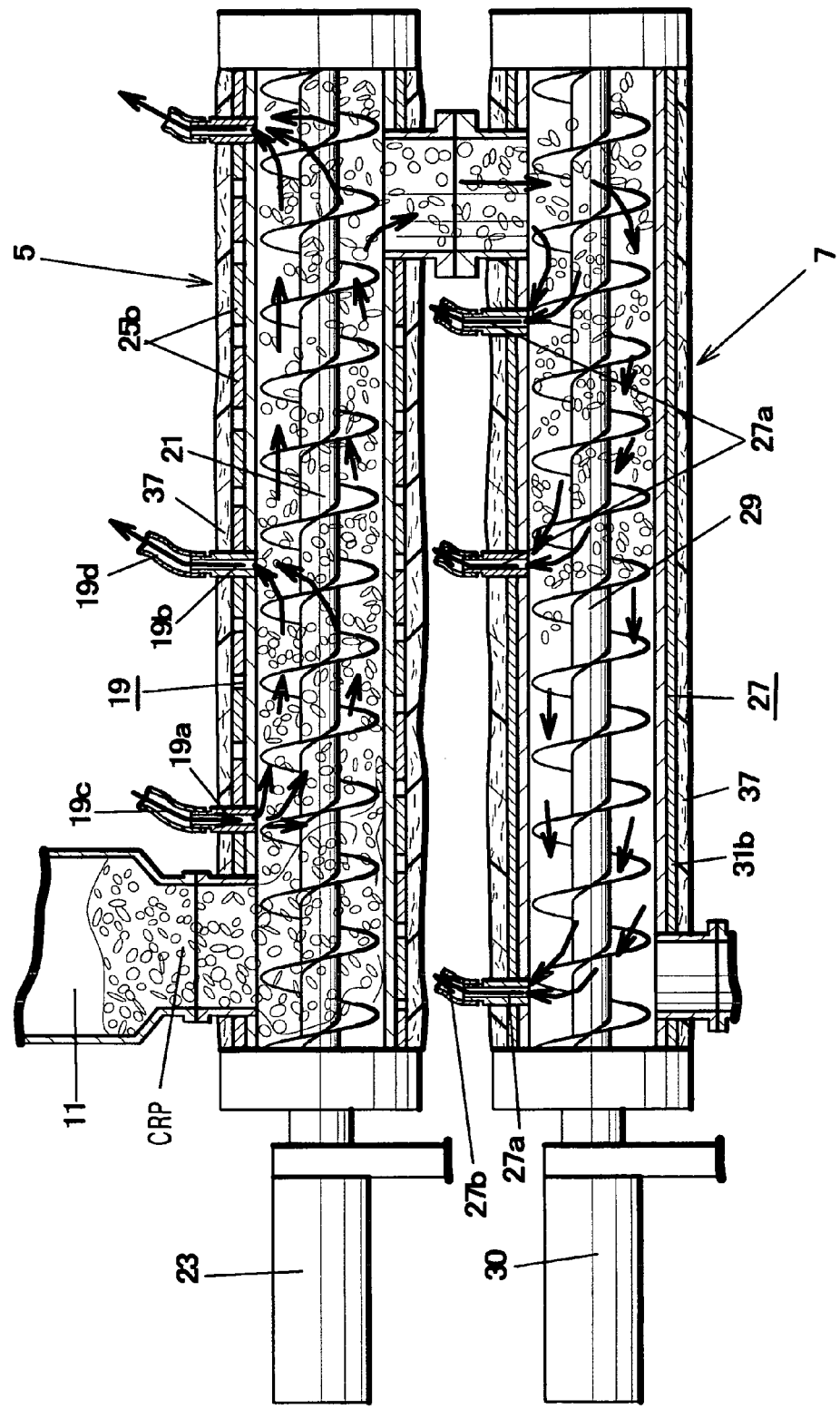
FIG. 6 is a schematic illustration of resin pellets being dried.

Since the crystallized resin pellets CRP are highly thermally resistant because they are crystalline, they would neither be softened nor molten if they are heated to a high temperature level from the time when they are introduced into the upper level cylinder 19. The steam that is driven off from the crystallized resin pellets CRP is delivered on the air flows directed from the air inlet port 19a respectively toward the air outlet port 19b and the air output port 27a (see FIG. 6).

Figure 7:
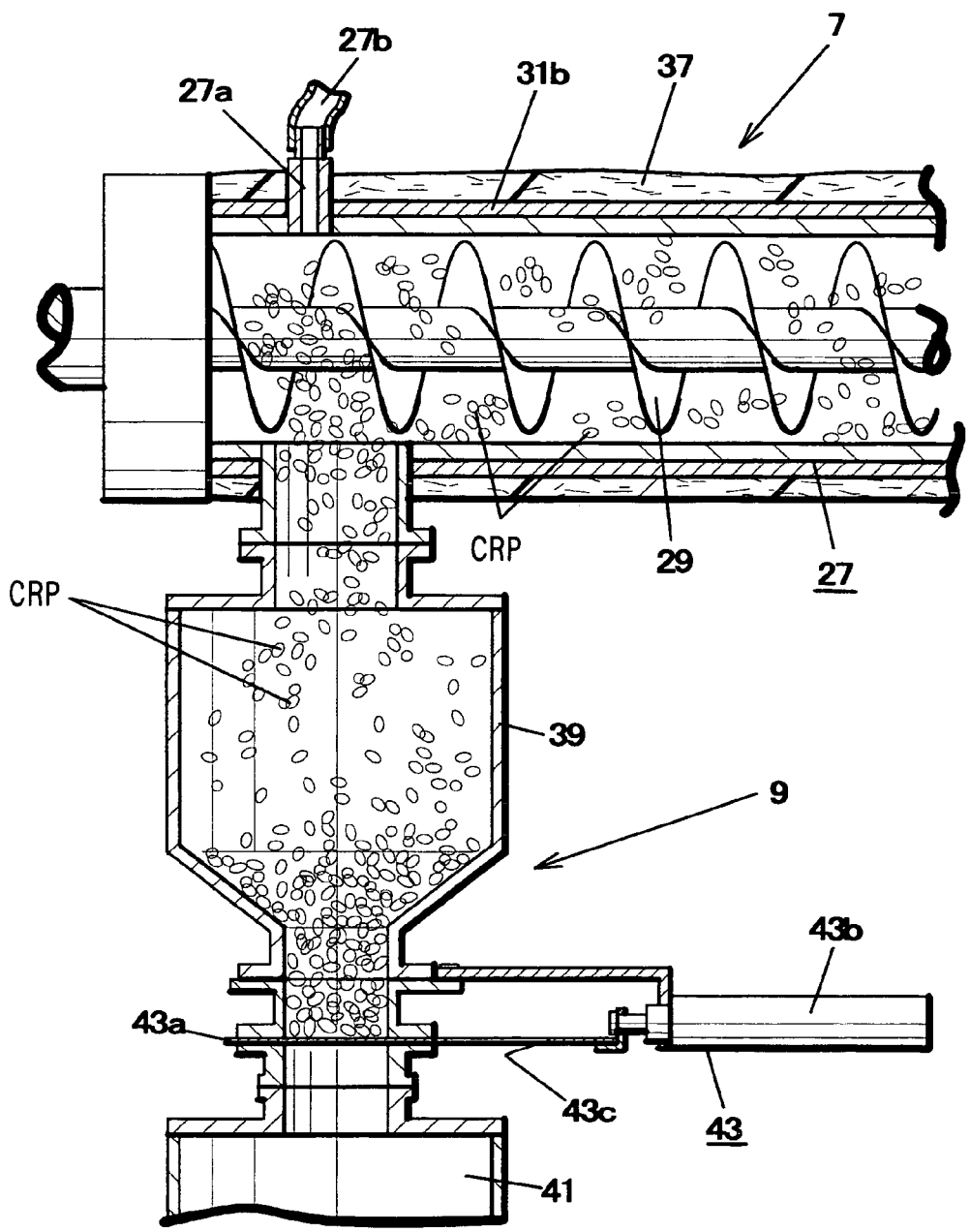
FIG. 7 is a schematic illustration of resin pellets being delivered into the buffer hopper.
Figure 8:
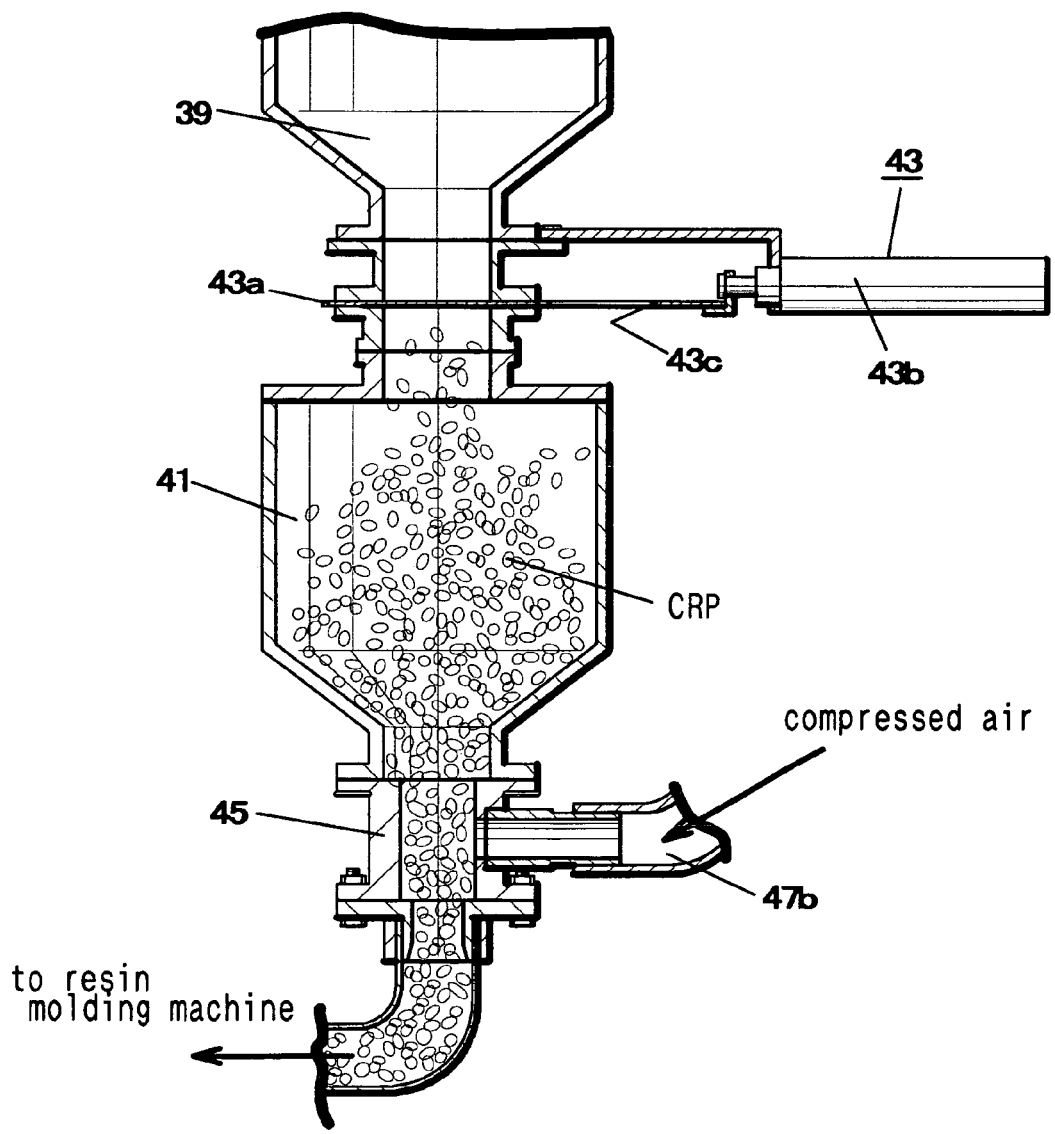
FIG. 8 is a schematic illustration of resin pellets being supplied to a resin molding machine.

Referring now to FIG. 7, the crystallized resin pellets CRP that have been transferred toward the left side in FIG. 1 in the lower level cylinder 27 and dehumidified and dried fall in the buffer hopper 39 by their own weights and accumulate there. When the crystallized resin pellets CRP in the buffer hopper 39 get to a required quantity and a delivery completion signal is output from the level sensor 57, the operation of driving the electric motors 23, 30, the air supply unit 33 and the air exhaust unit 35 is suspended and subsequently the actuator member 43b is driven to close the plate 43a and allow the crystallized resin pellets CRP accumulated in the buffer hopper 39 to fall in the delivery hopper 41 by their own weights. Then, compressed air is supplied by turning the changeover valve 49 to the air supply side in order to transfer the crystallized resin pellets CRP in the delivery hopper 41 to the raw material supply section of the resin molding machine under pressure (see FIG. 8).

In parallel with the above-described operation, the actuator member 13b may be driven to close the plate 13a in order to introduce crystallized resin pellets CRP to be dehumidified and dried into the hopper container 11.

As the operation of transferring the crystallized resin pellets CRP in the delivery hopper 41 under pressure is completed and an under pressure delivery completion signal is output from the level sensor 59, the actuator member 43b is driven to close the plate 43a and hence the communication path between the buffer hopper 39 and the delivery hopper 41 and subsequently the changeover valve 49 is turned to the air exhaust side so as to draw and introduce crystallized resin pellets CRP to be dehumidified and dried into the hopper container 11.

Now, the operation of dehumidifying and drying polyester type non-crystallized resin pellets typically made of PET or PEN will be described.

As pointed out earlier, non-crystallized resin pellets NCRP can easily be softened and molten when heated rapidly if compared with crystallized resin pellets CRP. For this reason, the sheath heaters 25a and the surface heaters 25b of the first heating member 25 arranged at the upper level cylinder 19 are electrically energized and so controlled as to heat the left side, the middle part and the right side of the upper level cylinder 19 in FIG. 1 respectively to a low temperature region, a middle temperature region and a high temperature region. The electrically energizing and controlling operation is conducted according to the temperature detection signals from the temperature sensors 61 arranged at the respective positions of the upper level cylinder 19.

On the other hand, as for the lower level cylinder 27, the sheath heaters 31a and the surface heaters 31b are electrically energized and so controlled as to heat the entire lower level cylinder 27 substantially uniformly in the horizontal direction.

Figure 9:
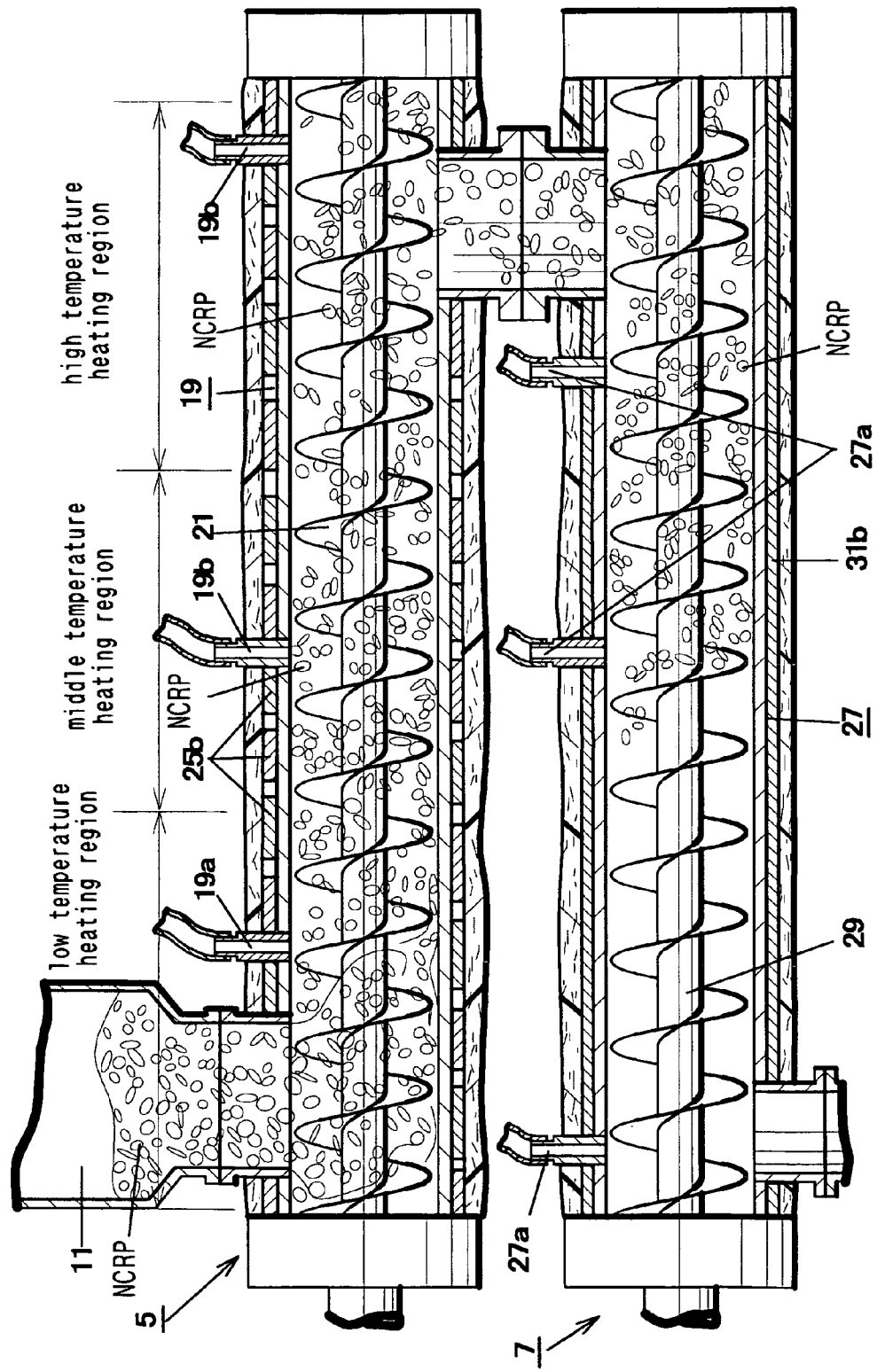
FIG. 9 is a schematic illustration of non-crystallized resin pellets being heated in the first cylinder section.

When the electric motor 23 is driven to rotate in the above condition in order to feed a predetermined quantity of non-crystallized resin pellets NCRP into the hopper container 11 at a required rate, the non-crystallized resin pellets NCRP that are introduced to the left side of the upper level cylinder 19 in FIG. 1 are gradually heated and crystallized to raise their thermal resistance as they are transferred by the rotary motion of the first transfer screw 21, passing through the low temperature heating region, the middle temperature heating region and the high temperature heating region as shown in FIG. 9.

Note that the air supplied to the left side of the upper level cylinder 19 in FIG. 1 is delivered to the middle part and the right side in FIG. 1 to form an air flow in order to prevent the non-crystallized resin pellets NCRP from being heated excessively and becoming softened and fused.

The non-crystallized resin pellets NCRP are crystallized by heating and their thermal resistance is improved as they are transferred in the upper level cylinder 19 to the right side thereof in FIG. 1. The non-crystallized resin pellets NCRP that are transferred in the lower level cylinder 27 are dried as they are heated by the second heating member 31 in a required low pressure condition because air is exhausted from the inside by way of the air outlet port 27a to remove moisture adhering to them and bound water contained in them.

At this time, an air flow is also formed in the lower level cylinder 27 as air supplied through the air inlet port 19a is partly delivered from the air outlet port 27a. Thus, this arrangement delivers steam produced as a result of dehumidifying to the outside by means of the air flow and hence improves the efficiency of dehumidifying and drying.

As described above, when dehumidifying and drying crystallized resin pellets CRP, this embodiment electrically energizes the upper level cylinder 19 and the lower level cylinder 27 under control to heat them entirely to a required temperature level for the purpose of dehumidifying and drying them. On the other hand, when dehumidifying and drying non-crystallized resin pellets NCRP, this embodiment electrically energizes the first heating member 25 so as to gradually raise the temperature of the upper level cylinder 19 in the direction of transferring non-crystallized resin pellets NCRP and crystallize and improve the thermal resistance of the non-crystallized resin pellets NCRP that are being transferred. Subsequently, the non-crystallized resin pellets NCRP are heated in the lower level cylinder 27 that is uniformly heated to a required temperature level so as to become dehumidified and dried. As a result, a single dehumidifying and drying apparatus 1 can efficiently dehumidify and dry both non-crystallized resin pellets NCRP and crystallized resin pellets CRP.

Figure 10:
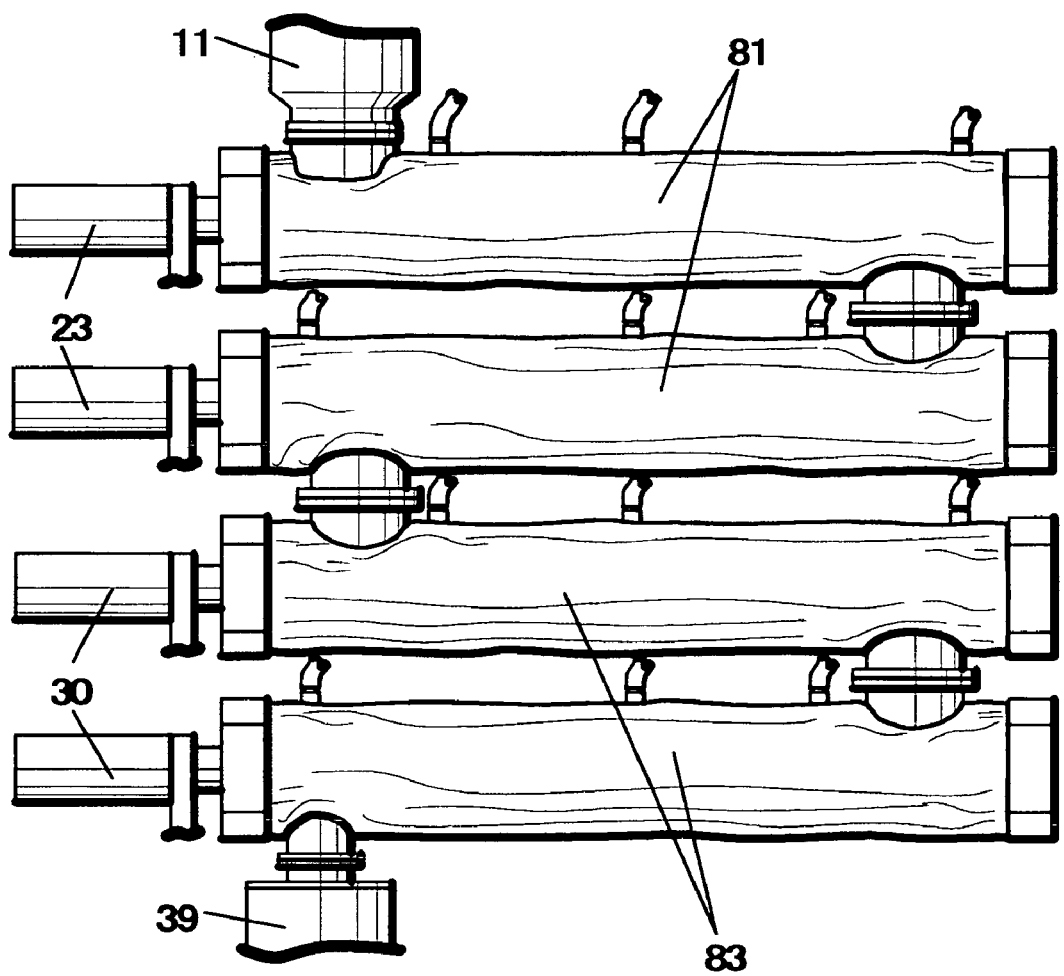
FIG. 10 is a schematic illustration of the multi-level cylinder sections, where component cylinders of each cylinder section are arranged horizontally one on the other.

While non-crystallized resin pellets NCRP are crystallized and their thermal resistance is improved in the upper level cylinder 19 and subsequently dehumidified and dried in the lower level cylinder 27 in the above description, there may be cases where a single upper level cylinder cannot satisfactorily crystallize non-crystallized resin pellets and/or a single lower level cylinder 27 cannot effectively dehumidify and dry crystallized resin pellets. The first cylinder section 81 for crystallization and the second cylinder section 83 for dehumidifying and drying may be realized as multi-level cylinder sections as shown in FIG. 10 (each cylinder section having two levels in FIG. 10).

While air is supplied from the upstream side of the first cylinder section 5 in the sense of the direction of transferring resin pellets to form an air flow in the first and second cylinder sections flowing in the sense of transferring resin pellets and deliver the air flow to the outside in the above description, air may be supplied not into the first cylinder section but from the upstream side of the second cylinder in the sense of transferring resin pellets to form an air flow when dehumidifying and drying non-crystallized resin pellets NCRP. Alternatively, not air but inert gas such as nitrogen gas may be supplied into the first or second cylinder section for dehumidifying and drying non-crystallized resin pellets NCRP.

What is claimed is:

1. An apparatus for dehumidifying and drying resin pellets comprising:
    a feed-in hopper section for receiving resin pellets supplied to the inside thereof;
    a first opening/closing member for opening and closing an upper aperture arranged in the feed-in hopper section;
    a first cylinder section having an end connected to and held in communication with the delivery side of the feed-in hopper section, the first cylinder section having a hollow section in the inside with a longitudinal axial line and rotatably supporting a first transfer screw in the inside thereof;
    a first electric motor for driving the first transfer screw to rotate at a required rotary speed;
    a first heating member for heating longitudinally divided regions of the first cylinder section to produce differentiated respective heating effects;
    a second cylinder section arranged continuously from and in parallel with the first cylinder section, said second cylinder section having a hollow section in the inside and rotatably supporting a second transfer screw in the inside thereof;
    a second electric motor for driving the second transfer screw to rotate at a required rotary speed;
    a second heating member for heating the entire second cylinder section;
    a delivery hopper section connected to an end of the second cylinder section to contain the resin pellets transferred through the first and second cylinder sections and deliver them to a raw material supply section of a resin molding machine;
    a second opening/closing member for opening and closing an aperture of a connection part of the second cylinder section and the delivery hopper section;
    an air supply section for supplying air at least to the inside of the first cylinder;
    an air exhaust member for delivering air from the inside of the first cylinder and that of the second cylinder to produce a required low pressure level there; and
    control means adapted to operate in a first dehumidifying and drying mode of controlling the heating operation of the first heating member for heating longitudinally divided regions of the first cylinder section to produce differentiated respective heating effects and that of the second heating member for uniformly heating the second cylinder section so as to crystallize the supplied non-crystallized resin pellets and subsequently dehumidifying and drying them and in a second dehumidifying and drying mode of controlling the heating operation of the first heating member and that of the second heating member for uniformly heating the first and second cylinder sections so as to dehumidifying and drying the supplied crystallized resin pellets.

2. The apparatus according to claim 1, wherein
    said first heating member is formed at least by a plurality of shaft heaters driven into the shaft of the first transfer screw or a plurality of surface heaters fitted to the outer surface of the first cylinder section.

3. The apparatus according to claim 1, wherein
    said control means electrically energizes the first heating member so as to heat the first cylinder section stepwise and gradually raise the temperature of the resin pellets being transferred in the inside thereof under control in the first dehumidifying and drying mode and electrically energizes the first heating member so as to uniformly heat the resin pellets being transferred in the first cylinder member substantially to a constant temperature level under control in the second dehumidifying and drying mode.

4. A method of dehumidifying and drying resin pellets by means of an apparatus for dehumidifying and drying resin pellets having:
- a first cylinder section having an end connected to a lower part of a feed-in hopper having an upper aperture adapted to be opened and closed so as to receive resin pellets supplied to it in the inside thereof, the first cylinder section having a hollow section in the inside with a longitudinal axial line and rotatably supporting a first transfer screw in the inside thereof;
- a second cylinder section connected to and arranged in parallel with the first cylinder section, said second cylinder section having a hollow section in the inside and rotatably supporting a second transfer screw in the inside thereof;
- a delivery hopper section connected to an end of the second cylinder section to contain the resin pellets transferred through the first and second cylinder sections and deliver them to a raw material supply section of a resin molding machine;
- an air supply section for supplying air at least to the inside of the first cylinder; and
- an air exhaust member for delivering air from the inside of the first cylinder and that of the second cylinder to produce a required low pressure level there;

said method:
heating entirely the first and second cylinder sections to a required temperature level and dehumidifying and drying the resin pellets being transferred under reduced pressure when dehumidifying and drying crystallized resin pellets; but
heating the first cylinder section so as to gradually raise the temperature thereof in the direction of transferring resin pellets, crystallizing the resin pellets being transferred, subsequently heating the entire second cylinder section to a required temperature level and dehumidifying and drying the crystallized resin pellets being transferred under reduced pressure when dehumidifying and drying non-crystallized resin pellets.

5. The method according to claim 4, wherein
it delivers air by means of the air exhaust member while introducing air from the air supply section to form an air flow in the inside under reduced pressure of a required level when crystallizing the non-crystallized resin pellets being transferred in the first cylinder section.

* * * * *